United States Patent
Dietrich et al.

(10) Patent No.: US 8,178,033 B2
(45) Date of Patent: May 15, 2012

(54) METHOD AND APPARATUS FOR RAPIDLY GENERATING AEROSPACE TOOLS

(75) Inventors: David M. Dietrich, St. Peters, MO (US); John G. Macke, Jr., St. Charles, MO (US); Robert D. Washington, Eureka, MO (US)

(73) Assignee: The Boeing Company, Chicago, IL (US)

( * ) Notice: Subject to any disclaimer, the term of this patent is extended or adjusted under 35 U.S.C. 154(b) by 130 days.

(21) Appl. No.: 12/484,639

(22) Filed: Jun. 15, 2009

(65) Prior Publication Data

US 2010/0314794 A1 Dec. 16, 2010

(51) Int. Cl.
*B29C 33/38* (2006.01)
(52) U.S. Cl. ........ 264/497; 264/219; 264/241; 264/337; 264/338; 264/480; 264/494; 264/496; 264/642; 264/643
(58) Field of Classification Search .................. 264/219, 264/337, 338, 497, 494, 496, 480, 642, 643, 264/241
See application file for complete search history.

(56) References Cited

U.S. PATENT DOCUMENTS

| | | | |
|---|---|---|---|
| 5,641,448 A | 6/1997 | Yeung et al. | |
| 5,867,857 A * | 2/1999 | Crouser et al. | 15/50.1 |
| 7,073,561 B1 | 7/2006 | Henn | |
| 7,270,167 B1 * | 9/2007 | Aversenti et al. | 264/219 |
| 2003/0102604 A1 * | 6/2003 | Mack et al. | 264/511 |
| 2007/0071902 A1 | 3/2007 | Dietrich et al. | |
| 2008/0065259 A1 | 3/2008 | Dietrich et al. | |

FOREIGN PATENT DOCUMENTS

EP 1277554 A1 1/2003

OTHER PUBLICATIONS http://en.wikipedia.org/wiki/Epoxy (retrieved Apr. 15, 2011).*
GB search report for application GB1009340.9 dated Oct. 1, 2010.

* cited by examiner

*Primary Examiner* — Joseph Del Sole
*Assistant Examiner* — Timothy Kennedy
(74) *Attorney, Agent, or Firm* — Yee & Associates, P.C.

(57) ABSTRACT

A method and apparatus may be present for manufacturing. A shell may be formed having a support structure located in a cavity in which the shell and the support structure may be formed using an additive manufacturing system from a design of a tool. The cavity of the shell may be filled with a filler material through an opening in the shell. The shell may be cured with the filler material to form the tool.

16 Claims, 8 Drawing Sheets

METHOD AND APPARATUS FOR RAPIDLY GENERATING AEROSPACE TOOLS

BACKGROUND INFORMATION

1. Field

The present disclosure relates generally to manufacturing and, in particular, to a method and apparatus for creating tools. Still more particularly, the present disclosure relates to a method and apparatus for creating tools for use in manufacturing aerospace parts.

2. Background

A need for spare parts and/or modifications to parts may occur during manufacture, assembly, maintenance, modifications, and/or upgrades to aircraft. Tools used to make these parts may be missing and/or difficult to find. As a result, on many occasions, tools may be remanufactured by an aircraft manufacturer to produce the needed parts. This type of process may require time and expense. Further, the number of parts needed may be low, as compared to the cost for manufacturing the tool for the parts.

The manufacturing and/or modification of parts also may occur during the design and/or testing of new aircraft. For example, without limitation, revisions and/or other changes to parts may occur even before an aircraft is delivered to a customer. Also, during the manufacturing of aircraft, selected parts may change and may need to be replaced on new aircraft and/or existing aircraft.

Changes to these parts may require the creation of tools. This tooling may be performed for new aircraft, existing aircraft, and/or legacy aircraft. The creation of tools for changes to parts during this type of design process may require time and expense. Lead times are often needed to allow suppliers of tools to manufacture and create the tools from the designs. As a result, the time and expense needed to design and complete an aircraft may increase. In addition, the lead times for tooling are critical to reacting to situations with aircraft on the ground.

One manner in which tooling may be created for manufacturing a low number of parts and/or design revisions may involve cutting a tool from a metal, such as aluminum. With this type of process, the tool may take around six to eight weeks. Currently, a new tool may be designed using a computer aided design (CAD) system. Once the design has been made, a file is created for use in making the tool. The file from the computer aided design system is entered into a numerical control program system that converts the file from a computer aided design system file into one for use by a numerical control machine. This numerical control machine system mills and/or cuts a block of steel or aluminum into the shape of a tool.

The numerical control program may be a computer that converts the computer aided design file into a format for use by the numerical control machine system. The output generated for the numerical control machine system takes the form of data or instructions for a program that tells the numerical control machine system how to remove material from a steel or aluminum block to create the tool. The numerical control machine system is a machine that automatically operates by commands from a processing unit. The processing unit in the numerical control machine system executes a program that identifies the different coordinates for the object to be created.

Converting the data in a computer aided design file for a tool into a form for use by a numerical control machine system may take from around 20 to around 60 hours of time. Further, creating the data for this type of tool also may be expensive and time consuming. In some cases, the creation of a tool, such as a die, may cost approximately $10,000 dollars, in addition to the time needed to create the data for the numerical control machine system.

If changes to the tools are needed, revising the computer aided design file creating the new program for the numerical control machine system may be required. These types of changes result in more time and expense being incurred in creating the tool for the part.

Therefore, it would be advantageous to have a method and apparatus that takes into account one or more of the issues discussed above, as well as possibly other issues.

SUMMARY

In one advantageous embodiment, a method may be present for manufacturing. A shell may be formed having a support structure located in a cavity in which the shell and the support structure may be formed using an additive manufacturing system from a design of a tool. The cavity of the shell may be filled with a filler material through an opening in the shell. The shell may be cured with the filler material to form the tool.

In another advantageous embodiment, a method may be present for manufacturing a composite aircraft part. A design of a tool may be created from an original part using a data processing system in which the design may be scaled to take into account changes in dimensions of a shell caused by curing the shell with a filler material. The shell may be formed having a support structure located in a cavity in which the shell and the support structure may be formed using an additive manufacturing system from the design of the tool in which the shell and the support structure may be comprised of a material selected from one of a plastic, a metal, a thermal plastic, acrylonitrile butadiene styrene, and a polycarbonate. A thermosetting epoxide polymer may be formed in a liquid state. A catalyst may be mixed with the thermosetting epoxide polymer in the liquid state to form an epoxy resin. The epoxy resin may be poured into the shell through an opening in the shell to fill the cavity of the shell. The shell may be moved such that air is removed from the epoxy resin in the shell. The shell may be cured with the epoxy resin for a first selected period of time. The shell may also be cured with the epoxy resin for a second selected period of time after curing the shell with the epoxy resin for the first selected period of time. A number of composite materials may be laid up for the composite aircraft part on the tool. The number of composite materials laid up on the tool may be cured to form the composite aircraft part.

In yet another advantageous embodiment, an apparatus may comprise a shell having a cavity, a support structure, and a filler material. The support structure may be associated with the cavity in the shell. The filler material may be in a cured stated and may be located within the support structure within the cavity of the shell.

In still another advantageous embodiment, a tool may be present for manufacturing composite aircraft parts. The tool may comprise a shell having a cavity, a support structure, and a thermally conductive epoxy. The support structure may be associated with the cavity in the shell, in which the shell and the support structure may be comprised of a material selected from one of a plastic, a metal, a thermal plastic, acrylonitrile butadiene styrene, and a polycarbonate. The thermally conductive epoxy may be in a cured state. The thermally conductive epoxy may be located within the support structure within the cavity of the shell in which the tool may be configured to withstand at least one of a pressure and a temperature used to cure a composite aircraft part formed using the tool.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
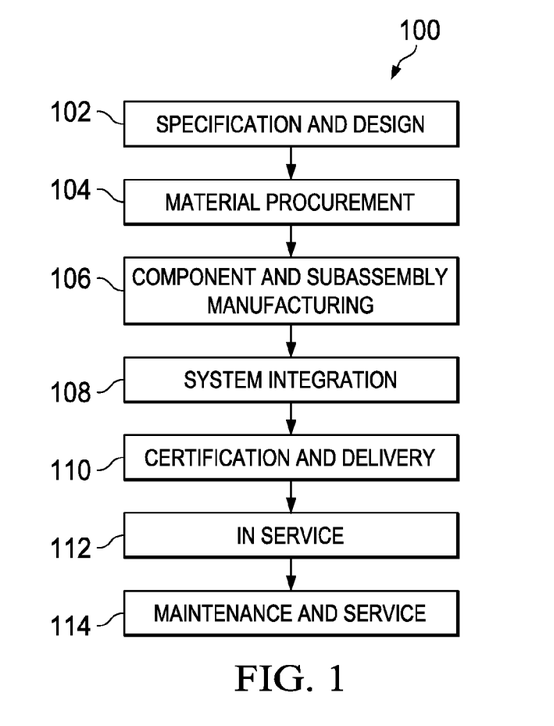
FIG. 1 is an illustration of an aircraft manufacturing and service method in accordance with an advantageous embodiment.
Figure 2:
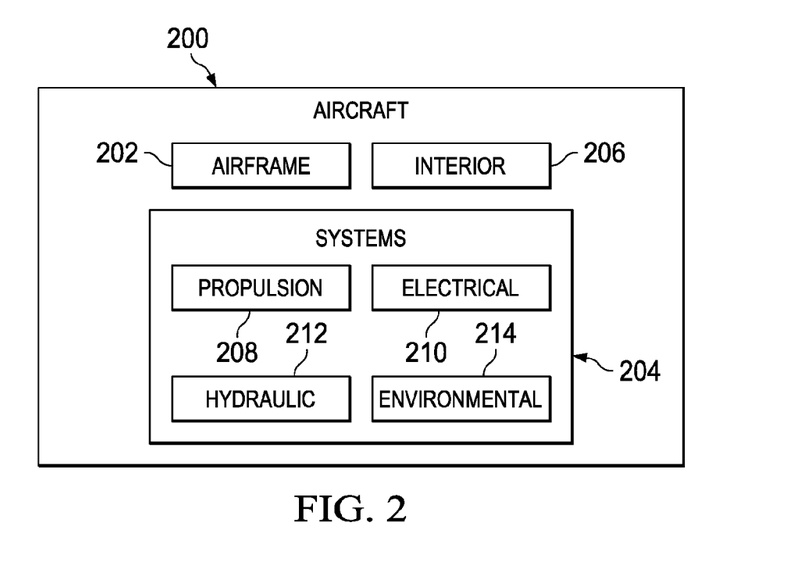
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, number of apparatus embodiments, method embodiments, or a combination thereof may be utilized during production stages, such as component and subassembly manufacturing 106 and system integration 108 in FIG. 1.

A number of, when referring to items, may be one or more items. For example, a number of apparatus embodiments may be one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of or reduce the cost of aircraft 200.

The different advantageous embodiments recognize and take into account a number of different considerations. For example, without limitation, the different advantageous embodiments recognize and take into account that one manner in which tools may be made is through using additive manufacturing processes. An additive manufacturing process is a process for making an object by adding layers. Examples of additive manufacturing processes include selective laser sintering and fused deposition modeling. These processes may create objects using various materials that may include plastic polymers.

The different advantageous embodiments also recognize and take into account that although these types of processes may allow for creating tools more rapidly than currently used processes using numerical control machine systems, another issue that may still be present is cost. For example, the different advantageous embodiments recognize and take into account that thermal plastics that may be used in fused deposition modeling may have high costs. Although the overall cost may not be as high as using the currently available methods, the cost savings may not be as great as desired. A thermal plastic is a polymer that turns into a liquid when heated and solidifies into a glassy state when sufficiently cooled.

Thus, the different advantageous embodiments provide a method and apparatus for manufacturing. In one advantageous embodiment, a shell having a support structure located in a cavity of the shell may be formed. The shell in the support structure may be formed using an additive manufacturing process from a design of a tool. The interior of the shell may be filled with a filler through an opening in the shell. The shell with the filler may then be cured to form a tool. Manufacturing of a part may then occur using the tool.

Figure 3:
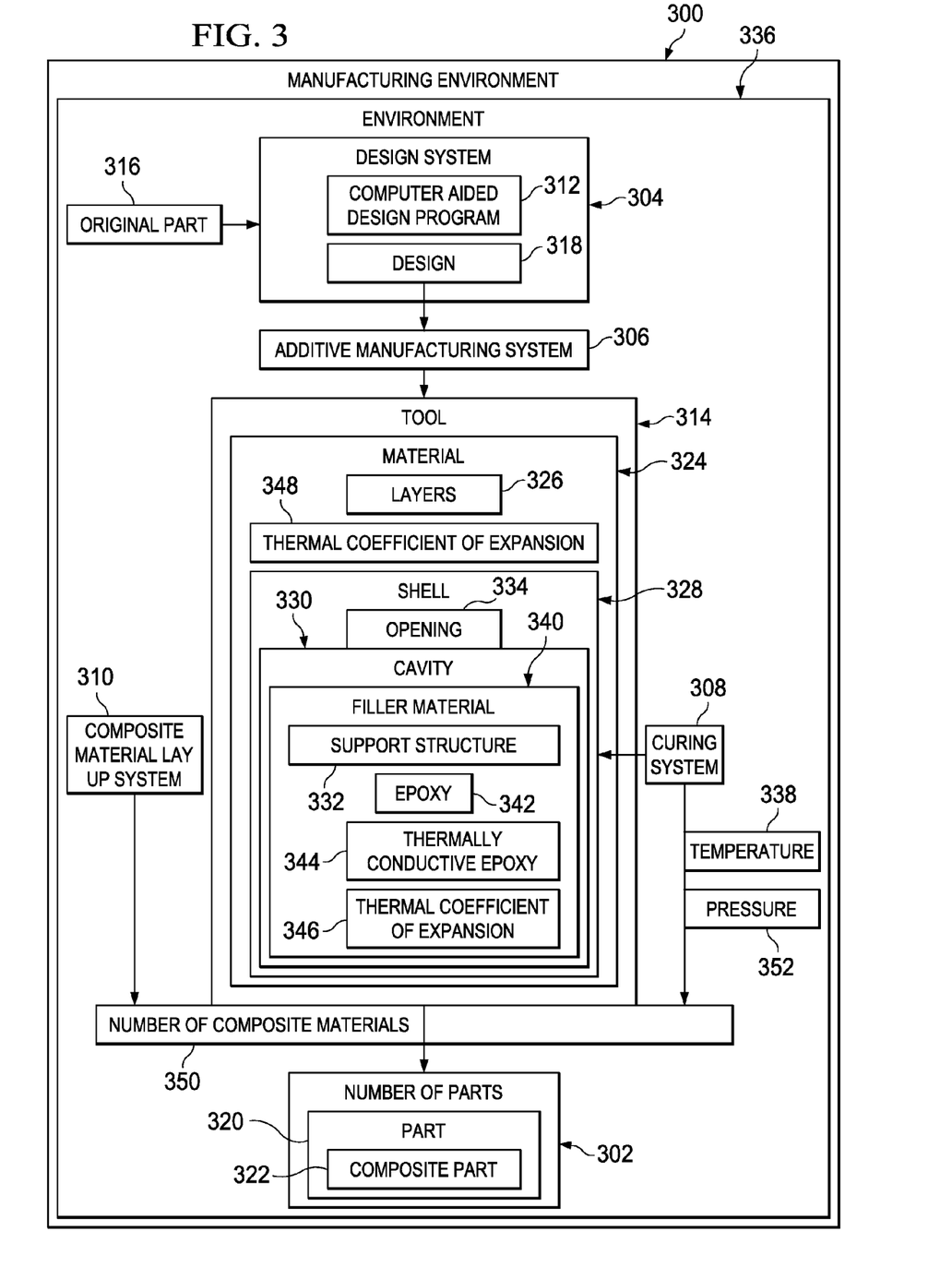
FIG. 3 is an illustration of a manufacturing environment in accordance with an advantageous embodiment.

With reference now to FIG. 3, an illustration of a manufacturing environment is depicted in accordance with an advantageous embodiment. In this illustrative example, manufacturing environment 300 may be used to create number of parts 302 for aircraft 200 in FIG. 2. In this illustrative example, manufacturing environment 300 may include design system 304, additive manufacturing system 306, curing system 308, composite material lay up system 310, and any other suitable systems or machines needed to manufacture number of parts 302.

In these examples, design system 304 may include computer aided design program 312, which may be software used to design parts. Computer aided design program 312 may be a three-dimensional computer aided design program in these examples. In manufacturing number of parts 302, tool 314 may be required to manufacture number of parts 302. Tool 314 may be designed in a number of different ways.

As used herein, a number of items may be one or more items. For example, without limitation, a number of parts may be one or more parts. Tool 314 may be designed using original part 316. Original part 316 may be, for example, without limitation, a computer aided design file containing a digital drawing of the part. Alternatively, original part 316 may be the actual part. If original part 316 takes the form of the actual part, original part 316 may be scanned and/or digitized for use by design system 304. Alternatively, original part 316 may be created from specifications for number of parts 302.

Through this process, design system 304 generates design 318. In this illustrative example, design 318 for tool 314 may be scaled to take into account expansion that may occur in tool 314 during use of tool 314 to manufacture parts in curing system 308. In these illustrative examples, part 320 in number of parts 302 may take the form of composite part 322.

In these illustrative examples, design 318 may not need to be converted into a numerical control program as with currently used processes. The elimination of this step may save time and expense in creating tool 314. When design 318 is received by additive manufacturing system 306, additive manufacturing system 306 may form tool 314. Tool 314 may be formed by adding material 324 in layers 326. Material 324 may take various forms. For example, without limitation, material 324 for tool 314 may include at least one of a plastic, a metal, a thermal plastic, a ceramic, a crylonitrile butadiene styrene, a polycarbonate, and other suitable materials.

In this illustrative example, tool 314, as created from design 318 using additive manufacturing system 306, may comprise shell 328 with cavity 330. Support structure 332 is present within cavity 330. Additionally, opening 334 may be present in shell 328. Support structure 332 may be any structure located within cavity 330. In these depicted examples, support structure 332 may provide structural reinforcement to shell 328. For example, without limitation, support structure 332 may reinforce shell 328 during the formation of shell 328, after the curing of shell 328, and/or during user handling of tool 314.

Material 324 may be any material capable of withstanding environment 336, which is present during manufacturing of number of parts 302. For example, without limitation, when part 320 takes the form of composite part 322, environment 336 may include pressure and heat that may be used during manufacturing of composite part 322. After shell 328 is created with support structure 332 within cavity 330 by additive manufacturing system 306, cavity 330 may be filled with filler material 340. Shell 328 and support structure 332 may be comprised of a material selected from one of a plastic, a metal, a thermal plastic, a ceramic, acrylonitrile butadiene styrene, a polycarbonate, and/or any other suitable material.

In these illustrative examples, cavity 330 with support structure 332 may be present to reduce the amount of material 324 needed to produce tool 314. Support structure 332 may provide structural reinforcement for shell 328 during the addition of filler material 340 in these examples.

In these illustrative examples, filler material 340 may be material that may be less costly as compared to material 324 for shell 328 and/or support structure 332. Filler material 340 may be selected as a material capable of providing support to shell 328 when placed into cavity 330 for use in manufacturing number of parts 302.

In these illustrative examples, filler material 340 may be selected as having thermal coefficient of expansion 346 substantially matching thermal coefficient of expansion 348 for material 324. In these illustrative examples, filler material 340 may be, for example, without limitation, an epoxy, a thermosetting epoxy polymer, a polymer, a thermally conductive epoxy, cement, and/or some other suitable type of material. In these illustrative examples, filler material 340 may be, for example, without limitation, epoxy 342. More specifically, epoxy 342 may be thermally conductive epoxy 344.

When filler material 340 is placed into cavity 330 in shell 328 through opening 334, shell 328 along with filler material 340 may be cured. This curing may be performed using curing system 308. The curing of shell 328 with filler material 340 may occur at around 74 degrees Celsius for around 16 hours, around 100 degrees Celsius for around two hours, around 125 degrees Celsius for around one hour, or some other suitable temperature and time regimen, depending on the selection of filler material 340. Shell 328 with filler material 340 may be cured a second time. This second curing may be at around 150 degrees Celsius for around four to five hours.

After tool 314 is created, number of parts 302 may be manufactured using tool 314. When number of parts 302 includes composite part 322, number of composite materials 350 may be laid up onto tool 314 by composite material lay up system 310. Number of composite materials 350 may include, for example, without limitation, resins, carbon fiber reinforced materials, tape, and/or other suitable materials.

Curing of number of composite materials 350 laid up on tool 314 by curing system 308 may include, for example, without limitation, temperature 338 and pressure 352 within environment 336. Of course, number of composite materials 350 laid up on tool 314 also may be vacuum bagged, and a vacuum may be drawn during curing by curing system 308.

In this manner, tool 314 may be more rapidly manufactured. As a result, the amount of time needed for manufacturing number of parts 302 may be decreased. Further, the costs for tool 314 also may be decreased through avoiding making tool 314 as a solid object using material 324. Instead, shell 328 with cavity 330 and support structure 332 may be created using less of material 324. Additional structural support may be provided through the placement and curing of filler material 340 inside of cavity 330.

The illustration of manufacturing environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, tool 314 may be a two-part tool, rather than a one-part tool. Tool 314 may be, for example, without limitation, an outer mold line tool, an inner mold line tool, or some other suitable type of tool. Further, in some advantageous embodiments, tool 314 may be used to create a part made out of aluminum, titanium, and/or some other suitable type of metal other than a composite material. In other advantageous embodiments, support structure 332 may not be necessary.

Figure 4:
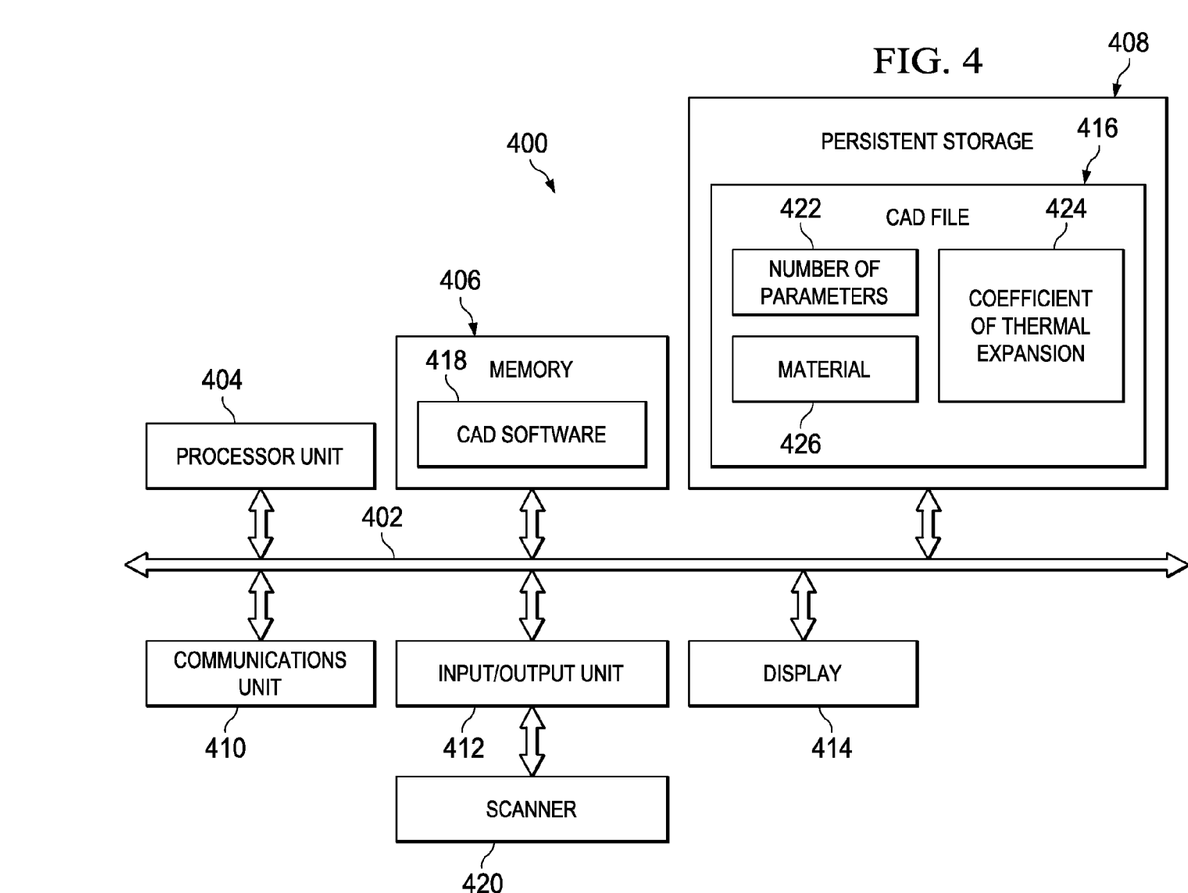
FIG. 4 is an illustration of a design system in accordance with an advantageous embodiment.

Turning now to FIG. 4, an illustration of a design system is depicted in accordance with an advantageous embodiment. In this example, data processing system 400 is an example of a data processing system that may be used to implement design system 304 in FIG. 3. In this illustrative example, communications fabric 402 provides communications between processor unit 404, memory 406, persistent storage 408, communications unit 410, I/O unit 412, and display 414.

Processor unit 404 serves to execute instructions for software that may be loaded into memory 406. Processor unit 404 may be a set of one or more processors or may be a multi-processor core, depending on the particular implementation. Memory 406, in these examples, may be, for example, without limitation, a random access memory. Persistent storage 408 may take various forms, depending on the particular implementation. Persistent storage 408 may be, for example, without limitation, a hard drive, a flash memory, a rewritable optical disk, a rewritable magnetic tape, or some combination of the above.

Communications unit 410, in these examples, may provide for data exchange with other data processing systems or devices. In these examples, communications unit 410 is a network interface card. I/O unit 412 allows for input and output of data with other devices that may be connected to data processing system 400. For example, I/O unit 412 may provide a connection for user input though a keyboard and mouse. Further, I/O unit 412 may send output to a printer. Display 414 provides a mechanism to display information to a user.

In these illustrative embodiments, data processing system 400 is used to create computer aided design (CAD) file 416 through the use of computer aided design (CAD) software 418 loaded into memory 406. The design generated by the use of computer aided design software 418 takes the form of computer aided design file 416 and is stored in persistent storage 408.

Computer aided design file 416 may be transmitted to an additive manufacturing system to create on object represented in computer aided design file 416. In these examples, the object may be, for example, without limitation, part 320 in FIG. 3. Computer aided design file 416 also maybe referred to as original part 316 in FIG. 3 in these examples.

Further, data processing system 400 may be connected to scanner 420. Scanner 420 is a three-dimensional scanner that digitizes part 320 in FIG. 3 for use by computer aided design software 418. Scanner 420 may be implemented using a number of different types of scanning devices. For example, without limitation, scanner 420 may be a computer-tomography scanner, a laser scanner, or a touch probe scanner. Part 320 may be used by data processing system 400 to generate computer aided design file 416 for part 320.

In designing tool 314 in FIG. 3, computer aided design file 416 for tool 314 may include number of parameters 422. Number of parameters 422 may take into account coefficient of thermal expansion 424 for material 426 used for tool 314. Number of parameters 422 may include dimensions that are scaled to accommodate for an increase in size based on coefficient of thermal expansion 424 when tool 314 is used in curing system 308 in FIG. 3.

Figure 5:
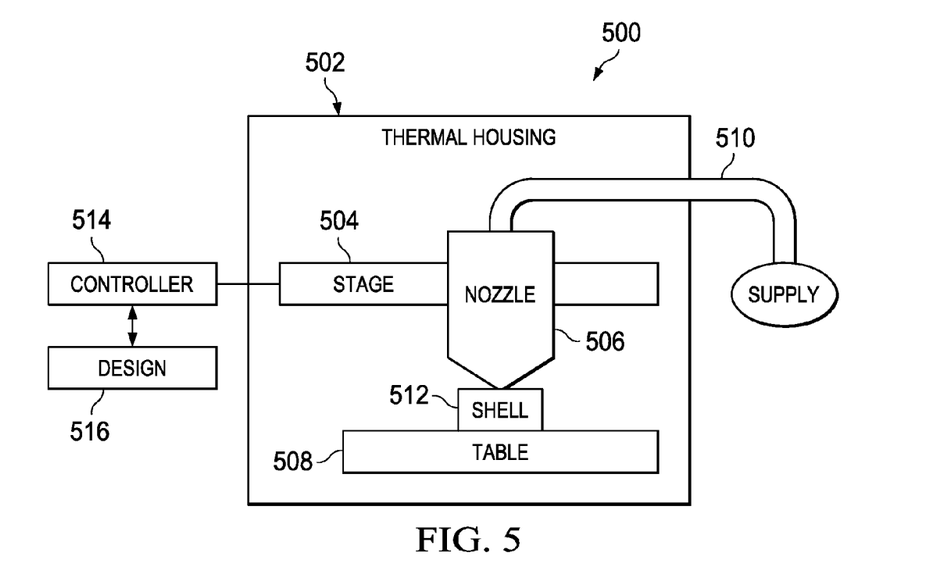
FIG. 5 is an illustration of components in an additive manufacturing system in accordance with an advantageous embodiment.

With reference next to FIG. 5, an illustration of components in an additive manufacturing system are depicted in accordance with an advantageous embodiment. In this illustrative example, fused deposition modeling system 500 is an example of a system that may be used to implement additive manufacturing system 306 in FIG. 3. As depicted, fused deposition modeling system 500 may include thermal housing 502, stage 504, nozzle 506, table 508, and any other suitable components.

Thermal housing 502 may be an oven that holds the temperature within thermal housing 502 around, but below the melting point of plastic filament 510. In this manner, only a small additional amount of thermal energy needs to be supplied to nozzle 506 to cause the plastic in plastic filament 510 to melt. This type of temperature system also may provide for better control of the process in creating an object, such as shell 512.

Stage 504 may be a mechanical stage that moves nozzle 506 on an x, y, and z axis to create shell 512. Nozzle 506 may be mounted within stage 504 and moved in x, y, and z directions as stage 504 is moved. Nozzle 506 may turn the flow of plastic onto shell 512 being constructed on and off.

The movement of stage 504 and the heating of nozzle 506 may be controlled though controller 514. Controller 514 may control the movement of stage 504 such that nozzle 506 creates layers of plastic in forming shell 512 on table 508. The manner in which stage 504 is moved may be controlled by controller 514 in response to design 516. In these illustrative examples, design 516 may be design 318 in FIG. 3.

Shell 512 may be created by placing layers of plastic one on top of another on table 508. This type of manufacturing may be an additive process in which layers are combined with each other to generate the object. This additive process also may be referred to as computer automated manufacturing or layered manufacturing. In these examples, controller 514 may slice the computer aided design model in design 516 into layers and may build those layers on table 508.

This type of manufacturing is in contrast to the commonly used processes of milling, drilling, or grinding, which are subtractive processes that remove material. The illustrative embodiments recognize that by not needing the generation of a numerical control program for a numerical control machine, such as a lathe or drill, time and money may be saved. Additionally, time and money also may be saved by reducing the amount of material needed to form shell 512. In these illustrative examples, shell 512 is not a solid shape for the tool.

In these illustrative examples, the plastic used to create shell 512 may take the form of plastic filament 510. Depending on the particular implementation, pellets, rather than filaments, may be used. The plastic used within fused deposition modeling system 500 may vary, depending on the particular implementation. In these examples, a polycarbonate (PC) may be employed. Other examples of materials that may be used include, for example, without limitation, acrylonitrile-butadiene-styrene (ABS), ABSi, polycarbonate-ABS blend, and polyphenylsulphone. An example of equipment that may be used to implement fused deposition modeling system 500 may be a Fortus 400 MC™ or a Fortus 900 MC™, which may be available from Stratasys, Inc.

The life of a tool created using fused deposition modeling may be increased by adjusting different factors. For example, without limitation, the density of the plastic is one factor that may help increase the lifespan of a tool. Further, with building layers, the orientation of the part on the platform, such as table 508, also may affect the lifespan of the tool.

Of course, other types of materials also may be used to manufacture shell 512. For example, without limitation, aluminum and other types of metals suitable for adaptive manufacturing also may be used. In these examples, a fused deposition modeling system is used. However, other types of additive manufacturing systems may be deployed, depending on the particular implementation. For example, stereolithography, selective laser sintering, and three-dimensional printing are examples of other additive manufacturing systems that may be used to create shell 512 in accordance with advantageous embodiments.

Figure 6:
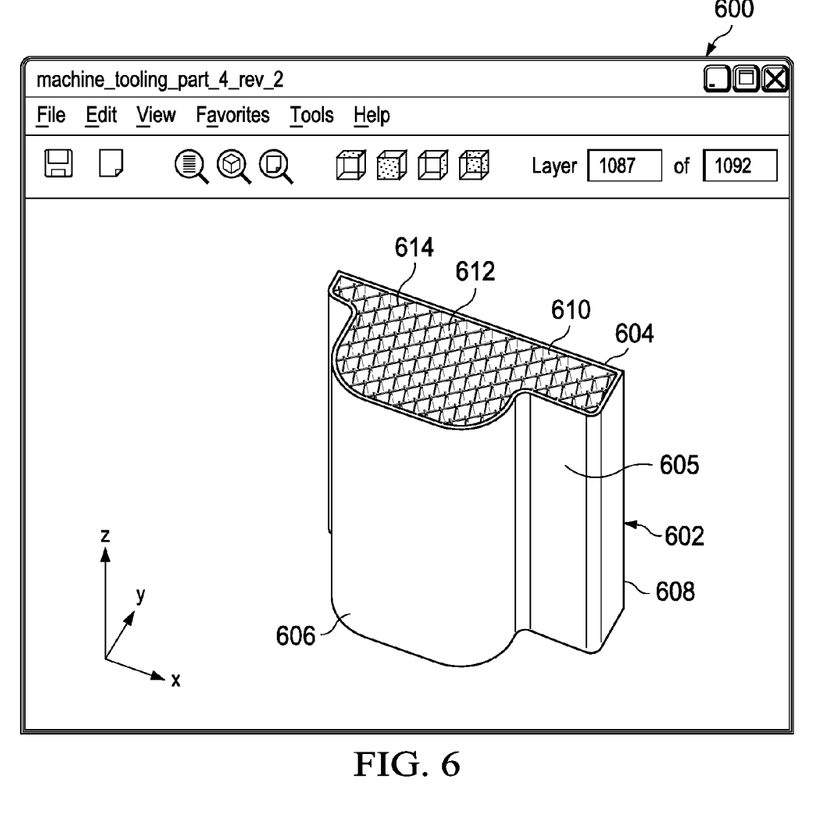
FIG. 6 is an illustration of a design for a tool in accordance with an advantageous embodiment.

With reference now to FIG. 6, an illustration of a design for a tool is depicted in accordance with an advantageous embodiment. In this illustrative example, display 600 is an example of a display that may be generated on display 414 in data processing system 400 by computer aided design software 418 in FIG. 4. In display 600, tool 602 is designed. In this example, display 600 includes model section 604 and support section 606. Material 605 may be used to build model section 604. Support section 606 is only used to support the construction of model section 604.

As can be seen in this example, model section 604 may form shell 608 with material 605 in model section 604. Shell 608 may be formed with opening 610 into cavity 612. In this example, support structure 614 may be located inside of cavity 612. Support structure 614 in support section 606 may be used to support the formation of shell 608. In other words, support structure 614 may provide structural reinforcement for shell 608 during manufacturing of shell 608. In these examples, support structure 614 may be removed after the formation of shell 608 has been completed.

Figure 7:
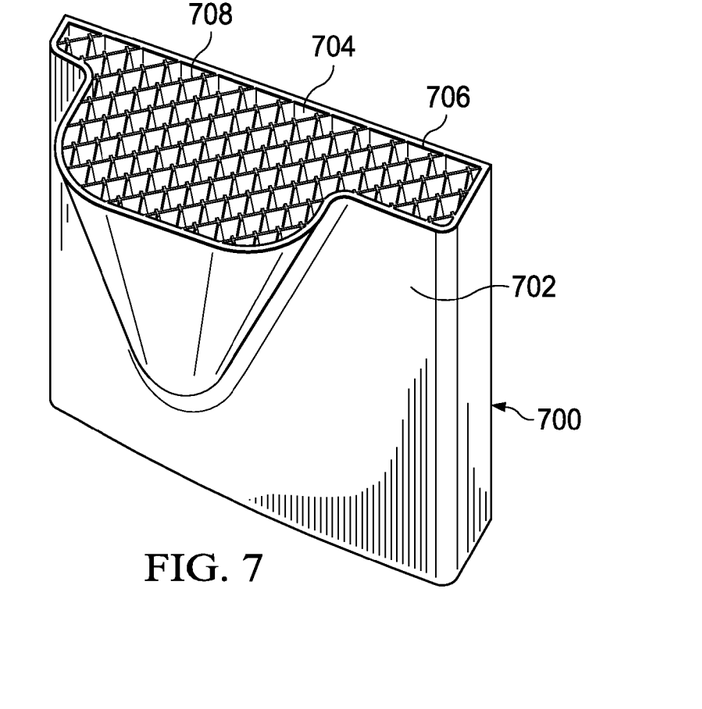
FIG. 7 is an illustration of a shell in accordance with an advantageous embodiment.

With reference now FIG. 7, an illustration of a shell is depicted in accordance with an advantageous embodiment. As can be seen in this illustrative example, tool 700 is an example of one implementation of tool 314 in FIG. 3. Tool 700 includes shell 702. Shell 702 may have cavity 704, which may be visible through opening 706. Support structure 708 may be located inside of cavity 704 of shell 702. Shell 702 may be formed using adaptive manufacturing system 306 in FIG. 3. In the illustrative example, tool 700 may not yet be completed because filler material 340 in FIG. 3 is not present within cavity 704. In particular, fused deposition modeling system 500 in FIG. 5 may be used to create shell 702 with support structure 708.

Figure 8:
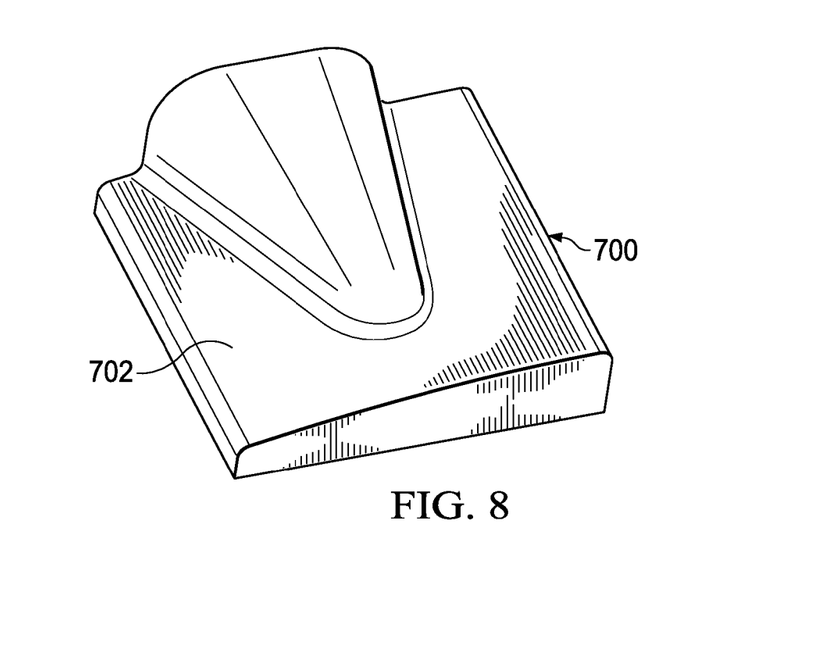
FIG. 8 is an illustration of another view of a tool in accordance with an advantageous embodiment.

With reference now to FIG. 8, an illustration of another view of tool 700 is depicted in accordance with an advantageous embodiment. In this example, shell 702 for tool 700 is depicted.

Figure 9:
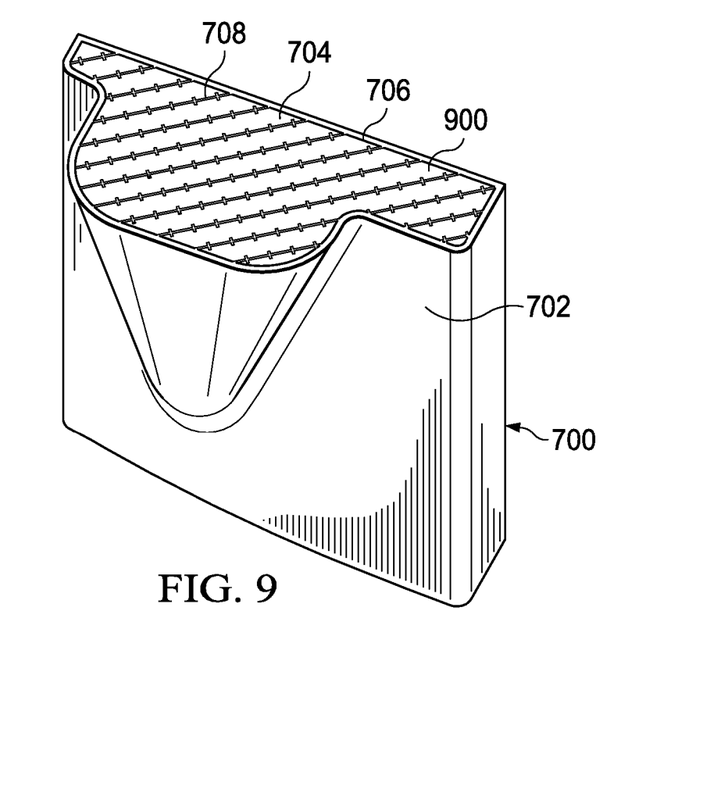
FIG. 9 is an illustration of a completed tool in accordance with an advantageous embodiment.

Turning now to FIG. 9, an illustration of a completed tool is depicted in accordance with an advantageous embodiment. In this illustrative example, cavity 704 may be filled with epoxy 900. Epoxy 900 may be poured in a liquid state into cavity 704 through opening 706. In this illustrative example, epoxy 900 may be cured to complete tool 700.

Figure 10:
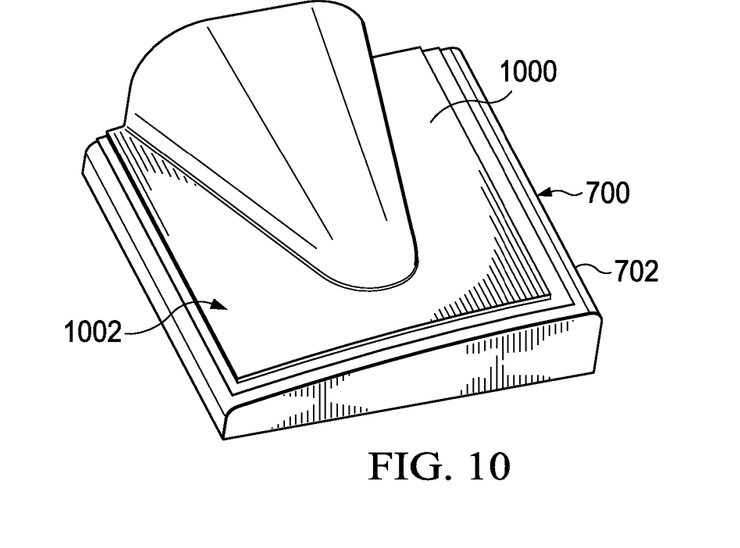
FIG. 10 is an illustration of a composite part formed on a tool in accordance with an advantageous embodiment.

Turning now to FIG. 10, an illustration of a composite part formed on a tool is depicted in accordance with an advantageous embodiment. In this illustrative example, composite materials 1000 and composite part 1002 may have been laid up on tool 700 and cured in curing system 308.

Figure 11:
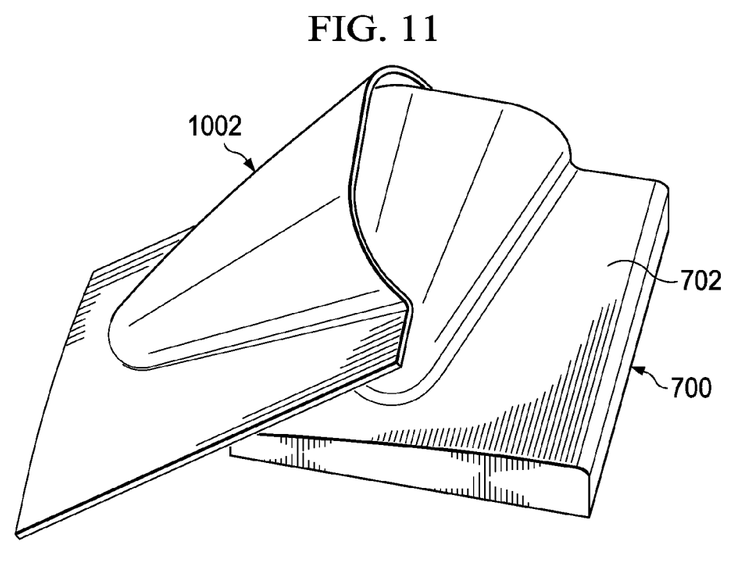
FIG. 11 is an illustration of a composite part separated from a tool in accordance with an advantageous embodiment.

With reference now to FIG. 11, an illustration of a composite part separated from a tool is depicted in accordance with an advantageous embodiment. In this illustration, composite part 1002 may be removed from tool 700 for use and/or analysis.

The illustration of tool 700 and the composite parts in FIGS. 7-11 have been presented for purposes of illustrating one manner in which tool 314 may be implemented and part 320 may be manufactured. Of course, in other advantageous embodiments, tool 314 may have other shapes. In this illustrative example, tool 700 may take the form of an inner mold line tool. In yet other advantageous embodiments, tool 700 may be an outer mold line tool. In still other advantageous embodiments, tool 700 may take the form of both an inner mold line tool and an outer mold line tool.

Figure 12:
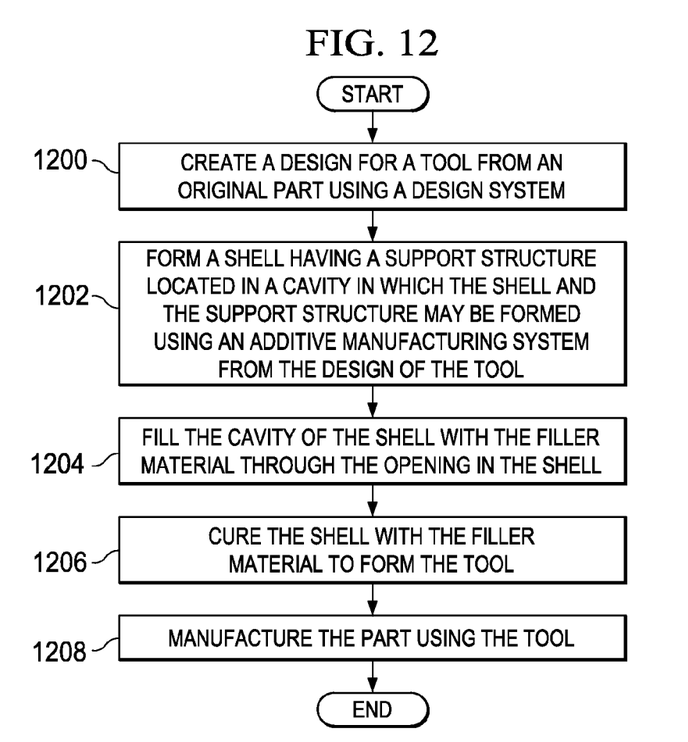
FIG. 12 is an illustration of a flowchart of a process for manufacturing in accordance with an advantageous embodiment.

Turning now to FIG. 12, an illustration of a flowchart of a process for manufacturing is depicted in accordance with an advantageous embodiment. The process illustrated in FIG. 12 may be implemented in manufacturing environment 300 in FIG. 3 in these illustrative examples.

The process may begin by creating design 318 for tool 314 from original part 316 using design system 304 (operation 1200). Thereafter, the process may form shell 328 having support structure 332 located in cavity 330 in which shell 328 and support structure 332 may be formed using additive manufacturing system 306 from design 318 of tool 314 (operation 1202). Thereafter, cavity 330 of shell 328 may be filled with filler material 340 through opening 334 in shell 328 (operation 1204).

The process may cure shell 328 with filler material 340 to form tool 314 (operation 1206). The curing of the shell with the filler may be performed in multiple steps in which multiple cures may be used to cure shell 328 with filler material 340. The process may then manufacture part 320 using tool 314 (operation 1208), with the process terminating thereafter.

Figure 13:
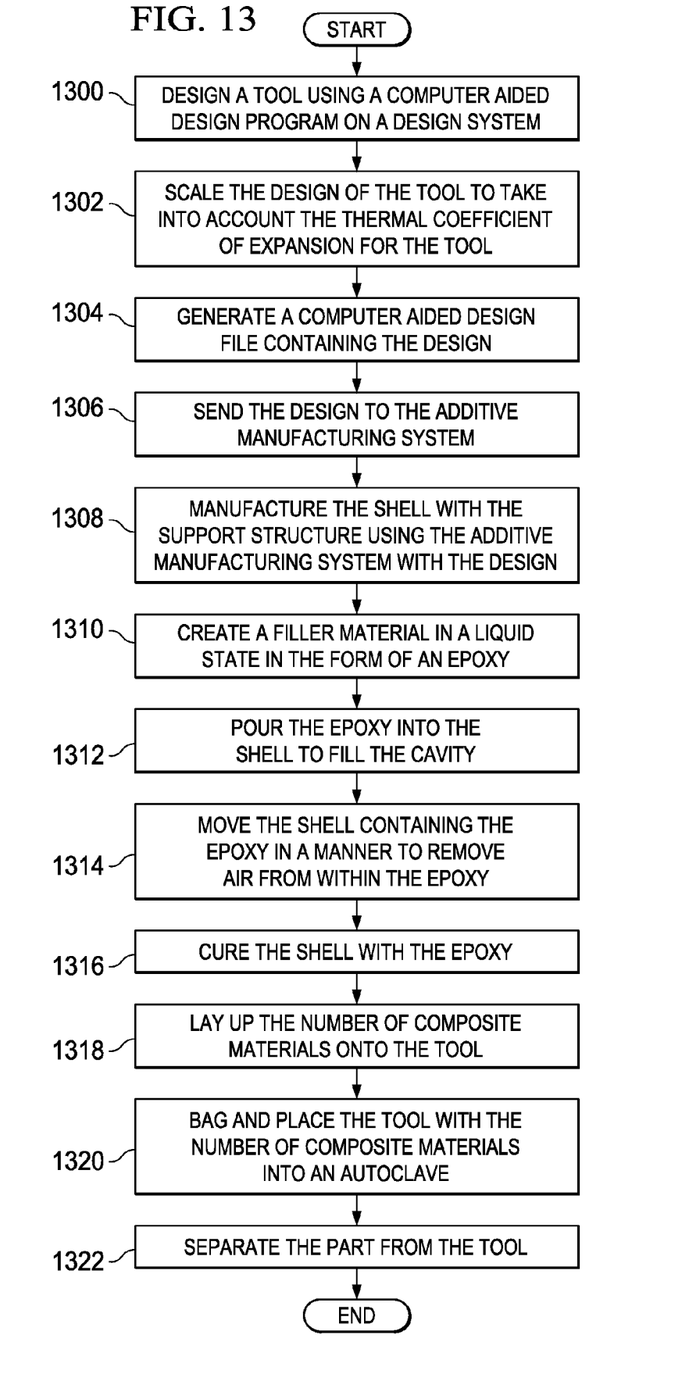
FIG. 13 is an illustration of a flowchart of a process for manufacturing in accordance with an advantageous embodiment.

With reference now to FIG. 13, an illustration of a flowchart of a process for manufacturing is depicted in accordance with an advantageous embodiment. The flowchart in FIG. 13 is an example of a process that may be implemented in manufacturing environment 300 in FIG. 3.

The process may begin by designing tool 314 using computer aided design program 312 on design system 304 (operation 1300). The process may then scale design 318 of tool 314 to take into account thermal coefficient of expansion 348 for tool 314 (operation 1302). The process may generate a computer aided design file containing design 318 (operation 1304).

The process may send design 318 to additive manufacturing system 306 (operation 1306). Shell 328 with support structure 332 may be manufactured using additive manufacturing system 306 with design 318 (operation 1308).

Thereafter, filler material 340 in the form of epoxy 342 may be created in a liquid state (operation 1310). Next, epoxy 342 may be poured into shell 328 to fill cavity 330 (operation 1312). Shell 328 containing epoxy 342 may be moved in a manner to remove air from within epoxy 342 (operation 1314). This movement may be a vibration sufficient to remove any air or air bubbles that may have formed within epoxy 342 when poured into cavity 330 in shell 328.

The process may cure shell 328 with epoxy 342 (operation 1316). This operation completes the manufacturing of tool 314 in these examples. The process may then lay up number of composite materials 350 onto tool 314 (operation 1318). Thereafter, tool 314 with number of composite materials 350 may be bagged and placed into an autoclave (operation 1320). The bagged number of composite materials in tool 314 may be cured in curing system 308. Thereafter, part 320 may be separated from tool 314 (operation 1322), with the process terminating thereafter.

The disclosure includes a method for manufacturing. The method includes the steps of forming a shell having a support structure located in a cavity in which the shell and the support structure are formed using an additive manufacturing system from a design of a tool; filling the cavity of the shell with a filler material through an opening in the shell, the filler material may be characterized by a thermal coefficient of expansion substantially matching a thermal coefficient of expansion of the material comprising the shell and the support structure; curing the shell with an epoxy filler material for a first selected period of time; and curing the shell with the epoxy for a second selected period of time after curing the shell with the epoxy for the first selected period of time. A part may be manufactured using the tool. Further the part may be attached to one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, and a building.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

The different advantageous embodiments provide a method and apparatus for manufacturing parts. In one advantageous embodiment, a shell is formed having a support structure located in the cavity in which the shell and the support structure are formed using the additive manufacturing system from a design of a tool. The cavity of the shell may be filled with filler material through an opening in the shell. The shell may then be cured with the filler material to form a tool. The shell may then be used to manufacture a number of parts.

Thus, in this manner, time and expense needed for creating tools may be reduced through one or more different advantageous embodiments as discussed above. One or more of the different advantageous embodiments may provide a capability to reduce the cost of materials needed to form tools. Further, the time needed to create tools to manufacture parts also may be reduced through the use of one or more of the different advantageous embodiments.

The description of the different advantageous embodiments has been presented for purposes of illustration and description, and it is not intended to be exhaustive or limited to the embodiments in the form disclosed. Many modifications and variations will be apparent to those of ordinary skill in the art.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for manufacturing, the method comprising:
    forming a shell having a support structure located in a cavity in which the shell and the support structure are formed using an additive manufacturing system from a design of a tool;
    filling the cavity of the shell with a filler material through an opening in the shell, the filler material is characterized by a thermal coefficient of expansion substantially matching a thermal coefficient of expansion of the material comprising the shell and the support structure;
    curing the shell with an epoxy filler material for a first selected period of time; and
    curing the shell with the epoxy for a second selected period of time after curing the shell with the epoxy for the first selected period of time, wherein the step of curing the shell with the epoxy for a second selected period of time comprises curing at a Temperature of at least around 150 degrees Celsius for at least around 4 hours.

2. The method of claim 1 further comprising:
    manufacturing a part using the tool.

3. The method of claim 2, wherein the manufacturing step comprises:
    laying up a number of composite materials for the part on the tool; and
    curing the number of composite materials laid up on the tool to form the part.

4. The method of claim 1 further comprising:
    creating the design of the tool from an original part using a data processing system.

5. The method of claim 4, wherein the design is scaled to take into account changes in dimensions of the shell caused by curing the shell with the filler material.

6. The method of claim 1, wherein the filling step comprises:
    forming a thermosetting epoxide polymer in a liquid state;
    mixing a catalyst with the thermosetting epoxide polymer in the liquid state to form an epoxy;
    pouring the epoxy into the shell through the opening in the shell to fill the cavity of the shell; and
    moving the shell such that air is removed from the epoxy in the shell.

7. The method of claim 1, wherein the filler material is selected from one of an epoxy, a thermally conductive epoxy, a polymer, and cement.

8. The method of claim 1, wherein the shell and the support structure are comprised of a material selected from one of a plastic, a metal, a thermal plastic, acrylonitrile butadiene styrene, and a polycarbonate.

9. The method of claim 2, wherein the part is attached to one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, and a building.

10. A method for manufacturing a composite part for an aircraft, the method comprising:
    creating a design of a tool from an original part using a data processing system in which the design is scaled to take into account changes in dimensions of a shell caused by curing the shell with a filler material;
    forming the shell having a support structure located in a cavity in which the shell and the support structure are formed using an additive manufacturing system from the design of the tool in which the shell and the support structure are comprised of a material selected from one of a plastic, a metal, a thermal plastic, acrylonitrile butadiene styrene, and a polycarbonate;

forming a thermosetting epoxide polymer in a liquid state;

mixing a catalyst with the thermosetting epoxide polymer in the liquid state to form an epoxy resin;

pouring the epoxy resin into the shell through an opening in the shell to fill the cavity of the shell;

moving the shell such that air is removed from the epoxy resin in the shell;

curing the shell with the epoxy resin for a first selected period of time, wherein the step of curing the shell with the filler for a first selected period of time further comprises curing at a Temperature and time selected from the group consisting of at least around 74 degrees Celsius for at least around 16 hours, at least around 100 degrees Celsius for at least around 2 hours, and at least around 125 degrees Celsius for at least around 1 hours;

curing the shell with the epoxy resin for a second selected period of time after curing the shell with the epoxy resin for the first selected period of time, the cured epoxy resin material is characterized by a thermal coefficient of expansion substantially matching a thermal coefficient of expansion of the material comprising the shell and the support structure;

laying up a number of composite materials for the composite part for the aircraft on the tool; and curing the number of composite materials laid up on the tool to form the composite aircraft part.

11. The method of claim 1, wherein the additive manufacturing system is selected from one of a fused deposition modeling system and a selective laser sintering system.

12. The method of claim 1, wherein the step of curing the shell with the filler for a first selected period of time further comprises curing at a Temperature of at least around 74 degrees Celsius for at least around 16 hours.

13. The method of claim 12, wherein the step of curing the shell with the epoxy for a first selected period of time further comprises curing at a Temperature of at least around 100 degrees Celsius for at least around 2 hours.

14. The method of claim 13, wherein the step of curing the shell with the epoxy for a first selected period of time further comprises curing at a Temperature of at least around 125 degrees Celsius for at least around 1 hours.

15. The method of claim 10, wherein the additive manufacturing system is selected from one of a fused deposition modeling system and a selective laser sintering system.

16. The method of claim 10, wherein the step of curing the shell with the epoxy resin for a second selected period of time comprises curing at a Temperature of at least around 150 degrees Celsius for at least around 4 hours.

* * * * *